United States Patent
Boespflug et al.

(10) Patent No.: US 8,205,433 B2
(45) Date of Patent: Jun. 26, 2012

(54) PULSE DETONATION/DEFLAGRATION APPARATUS AND RELATED METHODS FOR ENHANCING DDT WAVE PRODUCTION

(75) Inventors: Matthew Patrick Boespflug, Clifton Park, NY (US); Dennis Steenburgh, Caroga Lake, NY (US); Seyed Gholami Saddoughi, Clifton Park, NY (US); Grover Andrew Bennett, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1214 days.

(21) Appl. No.: 12/195,899

(22) Filed: Aug. 21, 2008

(65) Prior Publication Data

US 2010/0043395 A1 Feb. 25, 2010

(51) Int. Cl.
*F02K 5/02* (2006.01)
*F02K 7/00* (2006.01)

(52) U.S. Cl. .......... 60/247; 60/39.38; 60/39.76

(58) Field of Classification Search .......... 60/247, 60/39.38, 39.76, 39.15, 224, 225, 241; 431/1
See application file for complete search history.

(56) References Cited

U.S. PATENT DOCUMENTS

| | | | |
|---|---|---|---|
| 2,888,803 A | 6/1959 | Pon | |
| 5,937,635 A | 8/1999 | Winfree | |
| 6,003,301 A | 12/1999 | Bratkovich | |
| 6,439,503 B1 * | 8/2002 | Winfree et al. | 244/53 R |
| 6,442,930 B1 | 9/2002 | Johnson | |
| 6,668,542 B2 | 12/2003 | Baker | |
| 6,758,032 B2 | 7/2004 | Hunter | |
| 6,886,325 B2 | 5/2005 | Norris | |
| 6,901,738 B2 * | 6/2005 | Sammann et al. | 60/226.1 |
| 6,931,833 B2 * | 8/2005 | Lupkes | 60/207 |
| 6,983,586 B2 * | 1/2006 | Tangirala et al. | 60/39.77 |
| 7,047,724 B2 | 5/2006 | Nordeen | |
| 7,096,661 B2 | 8/2006 | Bush | |
| 7,100,360 B2 * | 9/2006 | Sammann et al. | 60/226.1 |
| 2006/0254252 A1 | 11/2006 | Rasheed | |
| 2006/0254254 A1 | 11/2006 | Saddoughi | |

* cited by examiner

*Primary Examiner* — William H Rodriguez
*Assistant Examiner* — Craig Kim
(74) *Attorney, Agent, or Firm* — Bracewell & Giuliani LLP

(57) ABSTRACT

Pulse detonation/deflagration apparatus for providing enhanced pressure wave operating frequency and/or magnitude, and methods of increasing the frequency or the magnitude of deflagration to detonation waves, are provided. A pulse detonation/deflagration apparatus can include a main/outer pulse detonation/deflagration actuator/engine (PDA/E) with multiple smaller internal combustion chambers or tubes positioned inside the cavity of the main/outer PDA/E with each performing the function of individual PDA/Es. The output pressure waves created by the internal PDA/Es can be utilized for propulsion or for controlling large scale flows, where needed.

24 Claims, 4 Drawing Sheets

PULSE DETONATION/DEFLAGRATION APPARATUS AND RELATED METHODS FOR ENHANCING DDT WAVE PRODUCTION

BACKGROUND OF THE INVENTION

1. Field of the Invention

The present invention relates to pulse detonation/deflagration actuators, engines, and other such apparatus, and related methods.

2. Description of Related Art

Conventional jet engines and the majority of rocket engines operate via subsonic combustion of fuel, known as deflagration. A pulse detonation actuator/engine is an apparatus, which in contrast, operates via supersonic detonation of fuel. Pulse detonation actuators/engines produce a high-pressure exhaust from a series of repetitive detonations within a detonation chamber. In operation, a gaseous fuel is detonated within a chamber, causing a pulse detonation wave, which propagates at supersonic speeds. The detonation wave compresses the fluid within the chamber, increasing its pressure, density and temperature. As the detonation wave passes out the open rearward end, thrust is created. The cycle is then repeated.

Pulse detonation engines conceptually allow for a high-speed cruise capability with a reliable low-cost system. Pulse detonation engines can incorporate many practical engineering advances over existing engines, such as the gas turbine. Pulse detonation allows for detonation of fuel to produce thrust more efficiently than existing systems. Pulse detonation can also be more efficient because of mechanical simplicity and thermodynamic efficiency. For example, pulse detonation engines can have fewer moving parts, lighter weight, and can require a lower cost to maintain and operate.

Application of the pulse detonation cycle requires coupling the high thermal efficiency of the detonation cycle with high propulsion efficiency in a practical device. Current combustion system models predict high propulsion efficiencies for pulse detonation engines and good thrust characteristics from low subsonic to high supersonic type regimes. Pulse detonation technology can also be applied to actuators to manipulate fluid flow, as well.

As indicated above, conventional pulse detonation/deflagration actuators and engines detonate combustible mixtures to produce thrust from high velocity exhaust gases within a high pressure and high temperature environment. The pulse detonation/deflagration actuators and engines, by their nature, however, by their nature, provide only a pulsed output. The conventional pulse detonation/deflagration actuators and engine designs generally comprise a single tube where pulsed combustion takes place at one end of the tube and travels to the other end of the tube, transforming from deflagration to detonation along the way to the end of the tube, where the highly pressurized detonation wave then exits. Methods to increase the operating frequency or magnitude of the pulsed output to try to obtain high aggregate operating frequencies and quasi-steady thrust have been generally limited to new valve techniques combined with multiple external tubes linked together and configured to perform slightly out of phase. Such additional external tubes and high-speed valves, however, not only occupy additional space and add additional weight, but they can also add an additional level of complexity. Recognized by the inventors, therefore, is need for a pulse detonation/deflagration actuator/engine or other such apparatus, which can provide for an increased operational frequency or magnitude of the pulsed output over that of the conventional pulse detonation/deflagration actuators/engines, along with a reduction in space required to operate over that of conventional applications of pulse detonation/deflagration actuators and engines.

Fluids in motion will have undesirable flow areas and areas that need directional control. One methodology of controlling fluid flow using pulse detonation devices is described, for example, in U.S. Pat. No. 6,758,032 by Hunter et al., titled "System of Pulsed Detonation Injection for Fluid Flow Control of Inlets, Nozzles, and Lift Fans," which is incorporated herein by reference in its entirety. Hunter describes use of pulse detonation devices for controlling a nozzle jet of a jet engine. Hunter also describes the use of pulse detonation devices to simplify lift fan systems for a tactical aircraft. Further, U.S. Pub No. 2006/0254254 by Saddoughi et al. titled "Mixing-Enhancement Inserts for Pulse Detonation Chambers," also incorporated herein by reference in its entirety, similarly describes use of pulse detonation actuators to manipulate fluid flow—particularly, thrust vectoring of a jet engine exhaust and manipulating fluid flow over aerodynamic surfaces. For thrust vectoring, the output of multiple individual pulse detonation actuators can be spaced axially along the longitudinal axis of an injection nozzle. For aerodynamic control, the output of multiple individual pulse detonation actuators can be spaced axially along the aerodynamic surface. Recognized by the inventors, however, is that, depending upon the characteristics of the flow, improved operating frequency control and/or increased pressure wave magnitude over that previously capable may be required or at least desirable to enhance system stability and reliability.

SUMMARY OF THE INVENTION

In view of the foregoing, embodiments of the present invention advantageously provide pulse deflagration/detonation apparatus and methods of enhancing deflagration to detonation wave production. Embodiments of the present invention also advantageously provide an apparatus including one or more high frequency in-line pulsed detonation/deflagration actuators or engines. Embodiments of the present invention advantageously overcome the difficulties of prior systems by providing a single containment pulse detonation/deflagration actuator/engine (PDA/E) tube with multiple smaller individual combustion PDA/E tubes separately longitudinally or radially positioned entirely within the containment PDA/E tube, whereby initial combustion takes place inside each of the smaller combustion PDA/E tubes, which is released into the larger containment PDA/E tube. Embodiments of the present invention also advantageously provide an apparatus including one or more multi-channel pulse detonation/deflagration actuators/engines, which can be readily implemented for nozzle area control & thrust vectoring.

More particularly, an embodiment of the present invention advantageously provides a pulse detonation/deflagration apparatus which can include a main/outer pulse detonation chamber having either a substantially closed or a partially open proximal end portion, a distal end portion having an exhaust aperture or apertures, and a main body extending therebetween and including a plurality of oxidizer inlet ports and a plurality of fuel inlet ports extending therethrough. The apparatus can also include a plurality of separate internal pulse detonation chambers positioned within the main body of the main pulse detonation chamber, which can each perform the function of an individual pulse detonation/deflagration actuator/engine. Each internal pulse detonation chamber can include a substantially closed proximal end portion, a distal end portion having an exhaust aperture, and a main body extending therebetween. Coinciding with the main body of the main outer pulse detonation chamber, the main body of each internal pulse detonation chamber can include a corresponding oxidizer inlet port and fuel inlet port.

According to an embodiment of the apparatus, the internal pulse detonation chambers are positioned longitudinally along a common longitudinal axis so that deflagration to detonation waves generated by each separate one of the plurality of internal pulse detonation chambers, travel in-line with each other and exit out the aperture in the distal end portion of the main pulse detonation chamber, thus, increasing the overall operating frequency of the apparatus. According to another embodiment of the apparatus, the internal pulse detonation chambers are separately radially positioned within the main body of the main pulse detonation chamber so that deflagration to detonation waves exiting through the aperture in the distal end portion of the main pulse detonation are at a higher magnitude than individual deflagration to detonation waves generated by any separate one of the plurality of internal pulse detonation chambers.

According to an embodiment of the apparatus, the apparatus can also include a plurality of fuel conduits, each extending between one of a plurality of fuel inlet ports in the main body of the main pulse detonation chamber and the fuel inlet port of one of the plurality of internal pulse detonation chambers. If the fuel inlets of the internal pulse detonation chambers are not combination fuels/oxidizer inlets, the apparatus can also include a corresponding plurality of separate oxidizer conduits, each extending between one of the plurality of oxidizer inlet ports in the main body of the main pulse detonation chamber and the oxidizer inlet port of one of the plurality of internal pulse detonation chambers.

Embodiments of the present invention also advantageously include methods of increasing a frequency or a magnitude of deflagration to detonation waves to produce high-speed jets, for example, for use in propulsion or large-scale flow control applications. A method, according to an embodiment of the present invention, can include the steps of supplying a fuel to each of a plurality of internal pulse detonation chambers positioned within a main body of a common main pulse detonation chamber, oxidizing the fuel within each of the plurality of internal pulse detonation chambers; and expelling exhaust gas from each of the plurality of internal pulse detonation chambers and into the common main pulse detonation chamber to thereby create a plurality of deflagration to detonation waves within the common main pulse detonation chamber, with each of the plurality of deflagration to detonation waves exiting through a same one or more exhaust apertures in the common main pulse detonation chamber.

The method can also include the step of positioning each of the plurality of separate internal pulse detonation chambers longitudinally along a common longitudinal axis so that deflagration to detonation waves generated by each separate one of the plurality of internal pulse detonation chambers travel in-line with each other and exit out the one or more common exhaust apertures. Correspondingly, according to such embodiment of the method, the step of oxidizing fuel within each of a plurality of internal pulse detonation chambers can include the step of firing each of the plurality of internal pulse detonation chambers in a sequential order to thereby increase operating frequency.

According to an alternative embodiment of the present invention, the method can include the step of positioning each of the plurality of separate internal pulse detonation chambers along a common radial plane within the main body of the main pulse detonation chamber so that deflagration to detonation waves exiting through the aperture in the distal end portion of the main pulse detonation are at a higher magnitude than individual deflagration to detonation waves generated by any separate one of the plurality of internal pulse detonation chambers. Correspondingly, according to such an embodiment of the method, the step of oxidizing fuel within each of the plurality of internal pulse detonation chambers can include the step of firing each of the plurality of internal pulse detonation chambers at substantially the same time to thereby increase pressure wave output magnitude.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
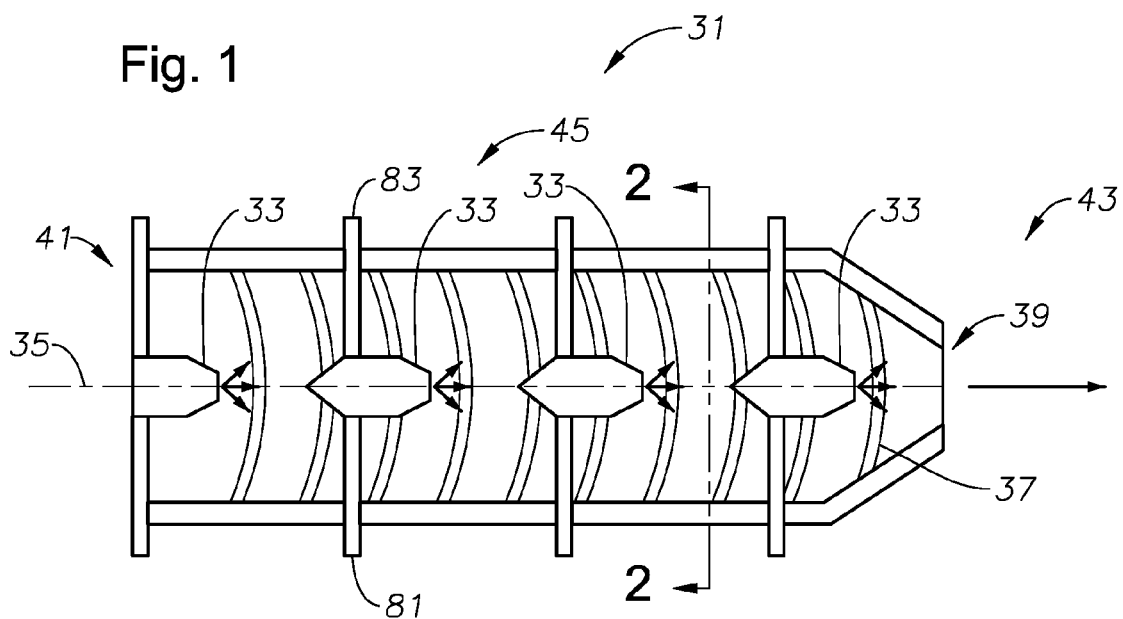
FIG. 1 is a schematic sectional view of a primary portion of a pulse detonation/deflagration apparatus including an main/outer pulse detonation/deflagration chamber or tube containing multiple internal pulse detonation/deflagration chambers or tubes according to an embodiment of the present invention.
Figure 2:
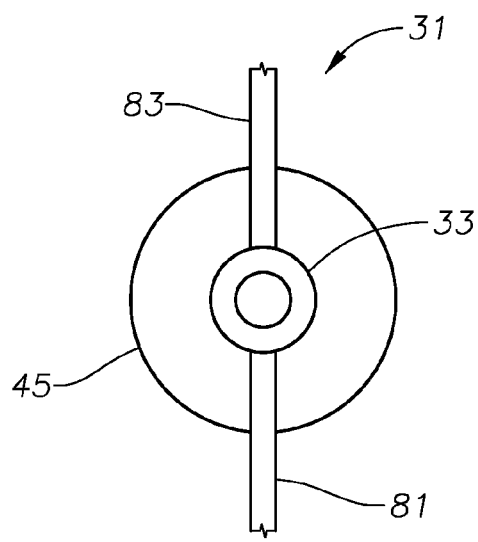
FIG. 2 is a schematic sectional view of the apparatus of FIG. 1 taken along the 2-2 line according to an embodiment of the present invention.

FIGS. 1-10 illustrate a pulse detonation/deflagration apparatus 30, 30', for producing highly pressurized detonation waves, which can be used to create thrust for propulsion, and/or vectoring thrust and jet engine nozzle area control. Referring to FIGS. 1 and 2, an embodiment of the present invention includes apparatus 30 having a main pulse detonation chamber, e.g., a single main/outer pulse detonation/deflagration actuator/engine (PDA/E) tube 31, containing multiple separate internal pulse detonation chambers, e.g., multiple smaller PDA/E tubes 33. Each of the internal pulse detonation chambers (PDA/E tubes) 33 function as individual PDA/Es where the initial combustion takes place inside each of the smaller internal PDA/E tubes 33 and is then released into the larger main/outer PDA/E tube 31. According to a preferred configuration, each of the smaller PDA/E tubes 33, internal to the larger PDA/E tube 31, can be deployed in single file formation along the longitudinal axis 35 of the outer PDA/E tube 31, one behind the other, so that the generated pressure waves 37 (e.g., deflagration to detonation (DDT) waves) travel in-line with each other and exit out the same exhaust aperture 39 or apertures 39'.

Figure 3:
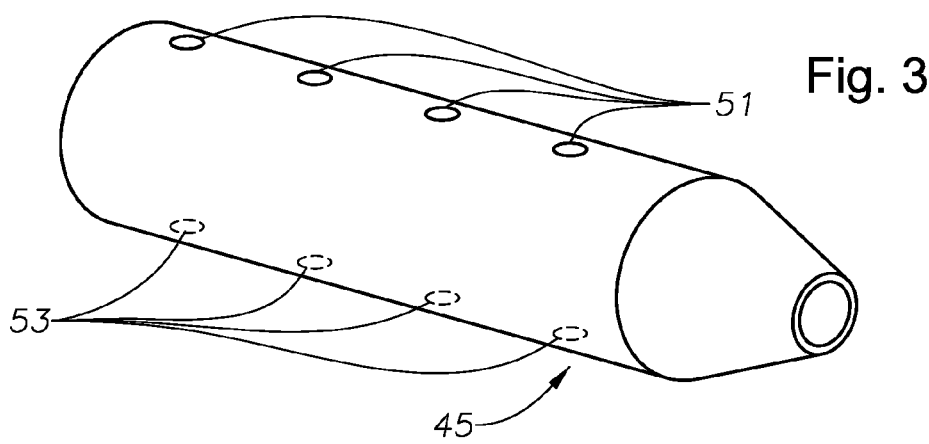
FIG. 3 is a perspective view of the main/outer pulse detonation/deflagration chamber or tube of FIG. 1 according to an embodiment of the present invention.
Figure 4:
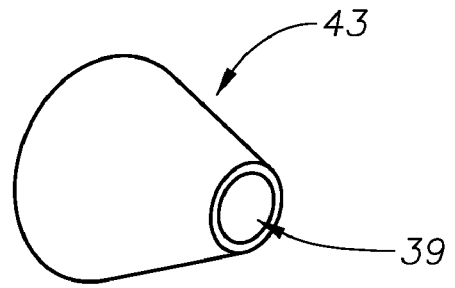
FIG. 4 is a partial perspective view of a distal end portion of a main/outer pulse detonation/deflagration chamber or tube according to an embodiment of the present invention.

The outer PDA/E tube 31 can include a closed or substantially closed proximal end portion 41, a distal end portion 43 having an exhaust aperture or apertures 39, and a main body 45 extending between the proximal and distal end portions 41, 43. In an alternate configuration (not shown), the proximal end portion 41 can be at least partially open to receive pressurized airflow from a secondary source such as, for example, engine bleed air, air from a compressor, ram air, etc. As shown in FIG. 3, the main body 45 can include multiple oxidizer inlet ports 51 and multiple fuel inlet ports 53. In an alternate configuration (not shown), only one set of combined fuel-oxidizer ports are provided. As shown in FIG. 4, according to a preferred configuration, the distal end portion 43 of the outer PDA/E tube 31 can be frusto-conically shaped to enhance the exhaust velocity of the exhaust gas exiting through the exhaust aperture 39.

Figure 5:
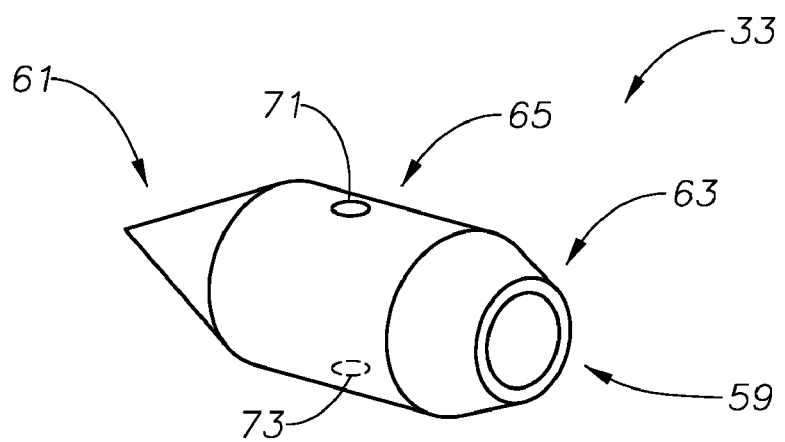
FIG. 5 is a perspective view of an internal pulse detonation/deflagration chamber or tube according to an embodiment of the present invention.
Figure 6:
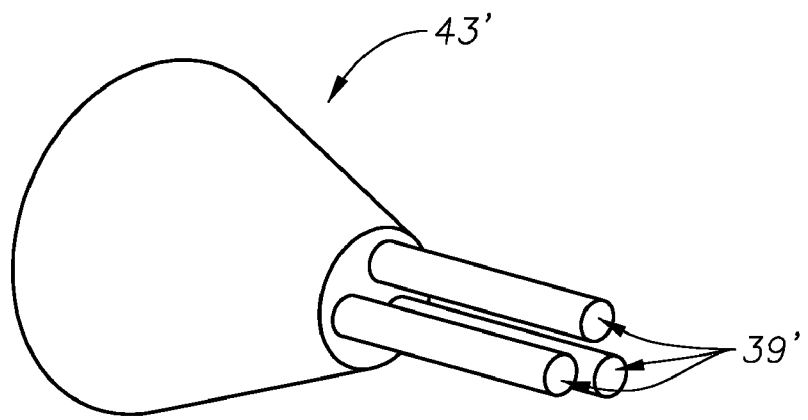
FIG. 6 is a partial perspective view of a distal end portion of a main/outer pulse detonation/deflagration chamber or tube having multiple orifices according to an embodiment of the present invention.

Referring to FIG. 5, each internal PDA/E tube 33 can include a substantially closed proximal end portion 61, a distal end portion 63 having an exhaust aperture 59, and a main body 65 extending therebetween. The main body 65 of each internal PDA/E tube 33 can include an oxidizer inlet port 71 and a fuel inlet port 73. In an alternate configuration (not shown), only one set of combined fuel-oxidizer ports are provided. According to a preferred configuration, the distal end portion 63 of each internal PDA/E tube 33 can be frusto-conically shaped to enhance exhaust velocity of the initially combusted exhaust fluid exiting through the exhaust aperture 59. The proximal end portion 61 of each internal PDA/E tube 33, except possibly the proximal most PDA/E tube 33, is preferably aerodynamically (e.g., conically) shaped to enhance passage of exhaust gas/pressure waves 37 from each upstream internal PDA/E tube 33.

Referring again to FIGS. 1-3 and 5, the pulse detonation/deflagration apparatus 30, 30', can include multiple fuel conduits 81, each extending between a separate one of the fuel inlet ports 53 in the main body 45 of the main/outer PDA/E tube 31 and a fuel inlet port 73 of a separate one of the internal PDA/E tubes 33. Similarly, the apparatus 30, 30', can include corresponding multiple oxidizer (e.g., air) conduits 83, each extending between a separate one of the oxidizer inlet ports 51 in the main body 45 of the main/outer PDA/E tube 31 and an oxidizer inlet port 71 of a corresponding separate one of the internal PDA/E tubes 33. Note, according to an alternative configuration, the fuel and oxidizer can be provided to a separate one of a plurality of common conduits (not shown) connecting each separate corresponding pair of combination fuel-oxidizer ports in the main/outer PDA/E tube 31 and in the internal PDA/E tubes 33.

According to an embodiment of the apparatus 30, the fuel and oxidizer conduits 81, 83, are structurally rigid, sufficient to support the internal PDA/E tubes 33 within the main/outer PDA/E tube 31. According to another embodiment of the apparatus 30, additional structural members (not shown) extending between an outer surface of each internal PDA/E tubes 33 and an inner surface of the main/outer PDA/E tube 31 can provide or enhance structural support of the internal PDA/E tubes 33.

According to a preferred configuration, small amounts of fuel and air delivered through conduits 81, 83, are mixed in each internal PDA/E tube 33 and ignited to create a combustion wave, which then transitions to a deflagration wave and/or a detonation wave 37. This wave 37 is directed along the longitudinal extent of the main body 45 of the main/outer PDA/E tube 31 and out of the main/outer PDA/E tube 31 through a single aperture 39 (see, e.g., FIG. 1) or through multiple apertures 39' (see, e.g., FIG. 6). This pressure rise generates high-speed jets propelling out of the main/outer PDA/E tube 31, which can be used as thrust or used in controlling larger scale flows, etc.

The apparatus 30, 30', can also include an ignition system (not shown) as known to those skilled in the art. One ignition system, which can be used with minimal modification, is described, for example, in U.S. Pat. No. 5,937,635 by Winfree et al., titled "Pulse Detonation Igniter for Pulse Detonation Chambers," which is incorporated by reference in its entirety. Various others known to those skilled in the art, of course, are within the scope of the present invention.

Figure 7:
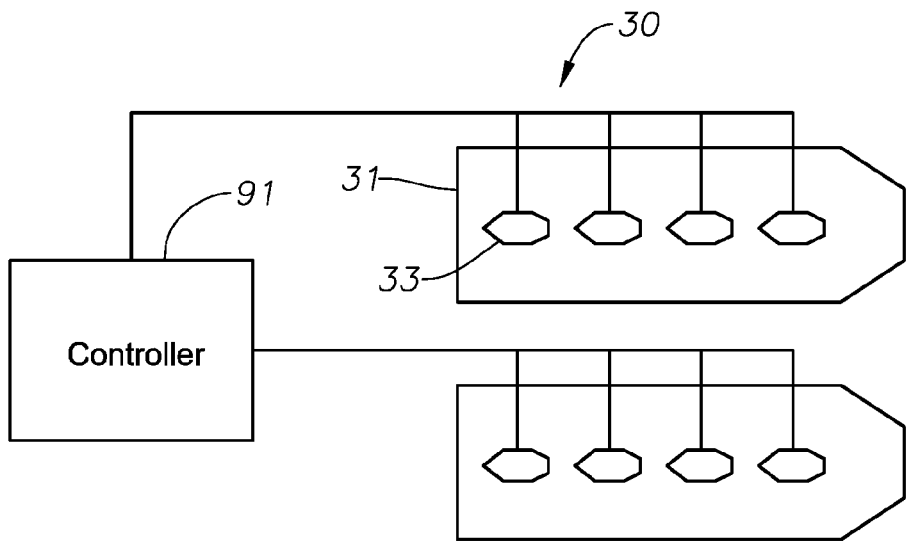
FIG. 7 is a schematic block diagram of a pulse detonation/deflagration apparatus according to an embodiment of the present invention.

According to a preferred embodiment of the apparatus 30, as shown in FIG. 1, each of the internal PDA/E tubes 33 are positioned longitudinally along a common longitudinal axis 35 so that deflagration to detonation waves 37 generated by each separate one of the internal PDA/E tubes 33 travel in-line with each other and exit out the aperture 39 or apertures 39' in the distal end portion 43, 43', of the main/outer PDA/E tube 31. According to such configuration, the apparatus 30 is configured so that each of the internal PDA/E tubes 33 "fire" in a sequential order to thereby increase operating frequency. For example, as shown in FIG. 7, the apparatus 30 can include a controller 91 in communication with each of the internal PDA/E tubes 33, which can include software/firmware as known to those skilled in the art of microprocessor systems, and which can provide the necessary signals or control fuel/air valves (not shown) upstream of the combustion chamber cavity of the internal PDA/E tubes 33 to manage such sequential control.

Figure 8:
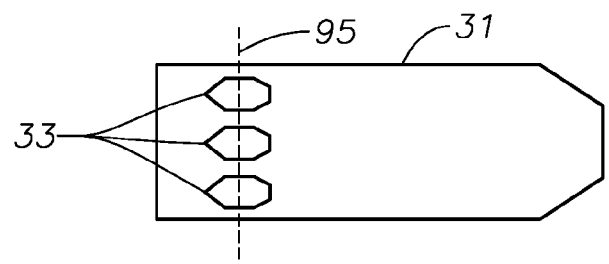
FIG. 8 is a schematic sectional view of a primary portion of a pulse detonation/deflagration apparatus according to an embodiment of the present invention.
Figure 9:
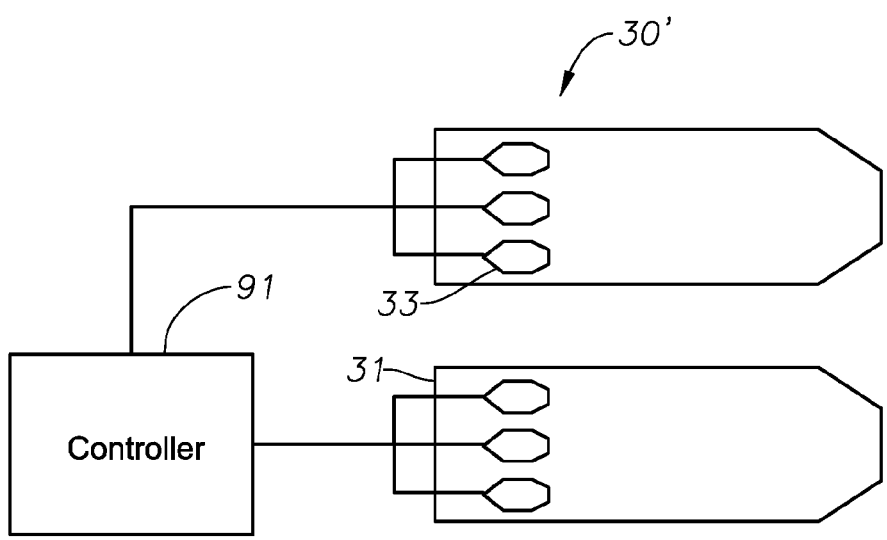
FIG. 9 is a schematic block diagram of a pulse detonation/deflagration apparatus according to an embodiment of the present invention.

According to an alternative embodiment of the apparatus 30', as perhaps best shown in FIG. 8, each of the internal PDA/E tubes 33 are positioned separately either inline or staggered along a common radial plane 95 so that deflagration to detonation waves 37 generated by each separate one of the internal PDA/E tubes 33 exit through the aperture 39 (see, e.g., FIG. 4) or apertures 39' (see, e.g., FIG. 6) in the distal end portion 43, 43', of the main/outer PDA/E tube 31, at an increased magnitude. According to such configuration, the apparatus 30' is configured so that each of the internal PDA/E tubes 33 "fire" at approximately a same time to thereby increase output magnitude. For example, as shown in FIG. 9, the apparatus 30' can include a controller 91 in communication with each of the internal PDA/E tubes 33, which can include software/firmware as known to those skilled in the art of microprocessor systems, and which can provide the necessary signals or control fuel/air valves (not shown) upstream of the combustion chamber cavity of the internal PDA/E tubes 33 to manage such firing control.

As noted previously, fluids in motion have undesired flow areas and areas that need directional control. According to an embodiment of the present invention, the apparatus 30, 30' can be employed in undesired flow areas, and/or to manipulate the direction of flow, and particularly, to control large-scale flows. Some examples of such uses include substitution of the main/outer PDA/E tube 31 including internal PDA/E tubes 33 for the PDAs featured/described in U.S. Pub No. 2006/0254254 by Saddoughi et al. titled "Mixing-Enhancement Inserts for Pulse Detonation Chambers."

According to one embodiment of the apparatus 30, 30', a single PDA/E tube 31 including internal PDA/E tubes 33 can be used to create a high-speed jet. According to another embodiment of the apparatus 30, 30', multiple PDA/E tubes 31 including internal PDA/E tubes 33 are tied together in series or in parallel to increase the operating frequency and/or pressure wave magnitude, respectively. When multiple PDA/E tubes 31 are linked in series, or by connecting one tube 31 to the next, each PDA/E tubes 31 can be set to "fire" in a sequential order to increase operating frequency. When multiple PDA/E tubes 31 are linked in parallel, each PDA/E tubes 31 can be set to "fire" at the same time to thereby increase the output magnitude. In either embodiment, the deflagration to detonation waves 37 can travel through a common plenum and enter the main flow through a common orifice. Alternatively, each PDA/E pressure wave 37 can enter the main flow through individual orifices. Note, alternate combinations of "firing" for parallel and series connected tubes 31 are also possible. Further, depending upon configuration, in both cases, each PDA/E tube 31 can have the respective internal PDA/E tubes 33 either configured as in FIG. 1 or as in FIG. 8.

Figure 10:
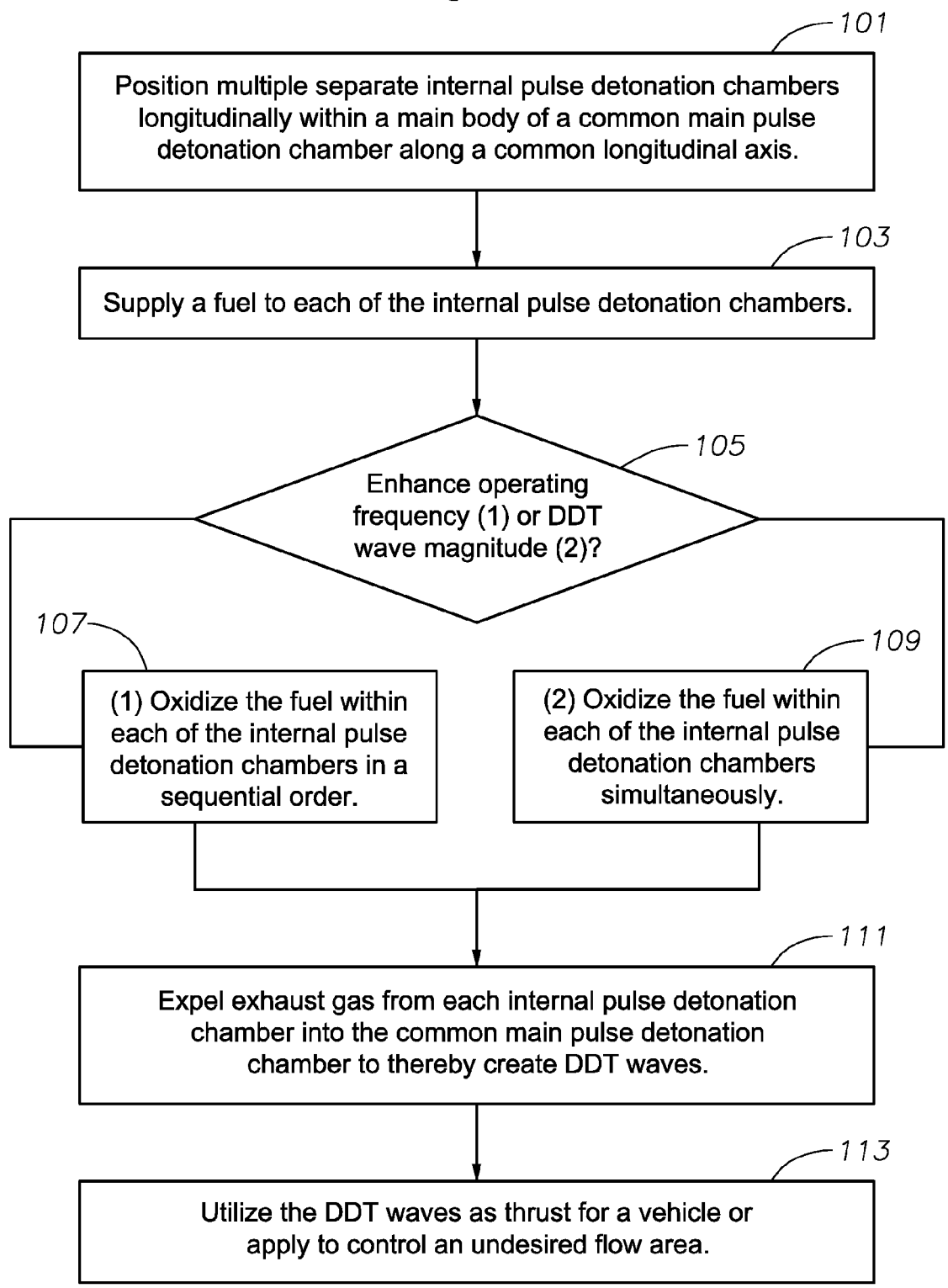
FIG. 10 is a schematic flow diagram of a method of increasing a frequency or a magnitude of deflagration to detonation waves according to an embodiment of the present invention.

Various embodiments of the present invention also include methods of increasing a frequency or a magnitude of deflagration to detonation waves. As shown in FIG. 10, such a method can include positioning multiple separate internal pulse detonation chambers (e.g., PDA/E tubes 33) longitudinally within a main body of a common main pulse detonation chamber (e.g., PDA/E tube 31) along a common longitudinal axis (block 101), and supplying a fuel to each of the internal pulse detonation chambers (block 103). Depending upon whether it is desired to enhance (increase) the operating frequency or the magnitude of the deflagration to detonation waves 37 (block 105), the method can also include oxidizing the fuel within each of the internal pulse detonation chambers 33 in a sequential order if it is desired to enhance operating frequency (block 107), or simultaneously oxidizing the fuel within each of the internal pulse detonation chambers 33 if it is desired to enhance deflagration to detonation wave magnitude (block 109). If enhanced operating frequency is desired, the internal pulse detonation chambers 33 can be positioned in-line, longitudinally as shown, for example, in FIG. 1. Alternatively, if enhanced magnitude of the deflagration to detonation waves 37 are desired, the internal pulse detonation chambers 33 can instead be positioned approximately along a same radius or radial plane 95 as shown, for example, in FIG. 8. The method further includes the step of propelling exhaust (initial combustion) gas from each internal pulse detonation chamber into the common main pulse detonation chamber to thereby create the usable deflagration to detonation waves 37 (block 111), and the step of utilizing the deflagration to detonation waves 37 as thrust for a vehicle or applying the deflagration to detonation waves 37 to control an undesired flow area (block 113).

Various embodiments of the present invention provide several advantages. For example, various embodiments of the present invention provide an apparatus 30, 30', including a main PDA/E tube 31 with multiple smaller combustion tubes 33 inside the cavity of the main PDA/E tube 31, whereby each of the internal combustion tubes 33 performs the function of individual PDA/Es wherein initial combustion takes place inside the smaller internal combustion tubes 33, which is then released into the larger tube 31. Advantageously, according to an embodiment of the apparatus 30, each of the smaller combustion tubes 33, internal to the larger tube 31, can be positioned in single file formation, one behind the other, so that the deflagration to detonation waves 37 travel in-line with each other and exit out the same exhaust hole(s) 39, 39'. Alternatively, according to an embodiment of the apparatus 30', each of the smaller combustion tubes 33, internal to the larger tube 31, can be positioned in a parallel formation, one along side the other, so that the deflagration to detonation waves travel in-line with each other and exit out the same exhaust hole(s) 39 39', substantially simultaneously. Advantageously, an embodiment of the apparatus 30, 30', can provide a single main combustion chamber 31 having multiple internal combustion chambers 33, which can be used to create a combustion/deflagration/detonation wave 37 which is directed out of the main combustion chamber 31 through a single orifice or multiple orifices, generating high-speed jets for use in controlling larger scale flows. Such apparatus 30, 30', can be used as a single unit operating at a specific frequency, or alternatively, can include multiple main combustion chambers 31 used as multiple units operating in series or parallel. Advantageously, multiple such main combustion chambers 31 can be tied together in series or parallel to increase operating frequency and/or magnitude. When the multiple main combustion chambers 31 are linked in series, each main combustion chamber 31 can "fire" in a sequential order to increase operating frequency. When the multiple main combustion chambers 31 are linked in parallel, each main combustion chamber 31 can "fire" at the same time to thereby increase the output magnitude, or alternatively, can "fire" in a sequential order to increase operating frequency. In both cases, each created pressure wave 37 can travel into a common plenum and enter the main flow through a shared orifice or each created pressure wave can enter the main flow through each of their own individual orifices.

In the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus, comprising:
a main pulse detonation chamber comprising a proximal end portion, a distal end portion having an exhaust aperture, and a main body extending therebetween, the exhaust aperture having a diameter substantially smaller than a diameter of the main body; and
a plurality of separate internal pulse detonation chambers positioned within the main body of the main pulse detonation chamber, each internal pulse detonation chamber comprising a proximal end portion, a distal end portion having an exhaust aperture, and a main body extending therebetween, the main body including a fuel inlet port, wherein the main pulse detonation chamber is configured so that initial combustion takes place separately inside each of the plurality of internal pulse detonation chambers; and wherein the plurality of separate internal pulse detonation chambers are positioned so that exhaust fluid from each of the plurality of internal pulse detonation chambers is commonly released into the main pulse detonation chamber at a location substantially upstream of the exhaust aperture.

2. The apparatus as defined in claim 1, wherein the distal end portion of the main pulse detonation chamber is frusto-conically shaped to enhance exhaust velocity of an exhaust fluid exiting through the exhaust aperture in the distal end portion of the main pulse detonation chamber; and wherein the distal end portion of each of the plurality of internal pulse detonation chambers is frusto-conically shaped to enhance exhaust velocity of an exhaust fluid exiting through the exhaust aperture in the distal end portion of the respective separate internal pulse detonation chamber.

3. The apparatus as defined in claim 1, further comprising a plurality of the main pulse detonation chambers, one of the plurality of main pulse detonation chambers having an aperture in the proximal end portion thereof being operably interfaced with the distal end portion of at least one other of the plurality of main pulse detonation chambers to thereby increase operating frequency.

4. An apparatus comprising:

a main pulse detonation chamber comprising a proximal end portion, a distal end portion having an exhaust aperture, and a main body extending therebetween; and a plurality of separate internal pulse detonation chambers positioned within the main body of the main pulse detonation chamber, each internal pulse detonation chamber comprising a proximal end portion, a distal end portion having an exhaust aperture, and a main body extending therebetween, wherein the proximal end portion of at least a first one of the plurality of internal pulse detonation chambers defining a first internal pulse detonation chamber is conically shaped to enhance passage of exhaust gas from a second one of the plurality of internal pulse detonation chambers defining a second internal pulse detonation chamber positioned upstream of the first internal pulse detonation chamber, wherein encountering the exhaust gas from the second internal pulse detonation chamber.

5. The apparatus as defined in claim 1, wherein each of the plurality of separate internal pulse detonation chambers are separately longitudinally positioned within the main body of the main pulse detonation chamber.

6. An apparatus comprising:

a main pulse detonation chamber comprising a proximal end portion, a distal end portion having an exhaust aperture, and a main body extending therebetween; and a plurality of separate internal pulse detonation chambers positioned within the main body of the main pulse detonation chamber, each internal pulse detonation chamber comprising a proximal end portion, a distal end portion having an exhaust aperture, and a main body extending therebetween, each internal pulse detonation chamber positioned separately longitudinally within the main body of the main pulse detonation chamber along a common longitudinal axis so that deflagration to detonation waves generated by each separate one of the plurality of internal pulse detonation chambers travel in line with each other and exit out the aperture in the distal end portion of the main pulse detonation chamber.

7. The apparatus as defined in claim 1, wherein the apparatus is configured so that each of the plurality of internal pulse detonation chambers fire in a sequential order to thereby increase operating frequency.

8. The apparatus as defined in claim 1, wherein each of the plurality of separate internal pulse detonation chambers are separately radially positioned within the main body of the main pulse detonation chamber so that deflagration to detonation waves exiting through the aperture in the distal end portion of the main pulse detonation chamber are at a higher magnitude than individual deflagration to detonation waves generated by any separate one of the plurality of internal pulse detonation chambers.

9. The apparatus as defined in claim 1, wherein the apparatus is configured so that each of the plurality of internal pulse detonation chambers fire at a same time to thereby increase output magnitude.

10. A pulse detonation apparatus, comprising:

a main pulse detonation chamber comprising an at least substantially closed proximal end portion, a distal end portion having and exhaust aperture, and a main body extending therebetween, the main body having a diameter substantially larger than the diameter of the exhaust aperture, the main body including a plurality of spaced apart oxidizer inlet ports and a plurality of spaced apart fuel inlet ports extending therethrough;

a plurality of separate internal pulse detonation chambers positioned within the main body of the main pulse detonation chamber so that exhaust fluid from each of the plurality of internal pulse detonation chambers is released into the common main pulse detonation chamber at a location substantially upstream of the exhaust aperture of the distal end portion of the main pulse detonation chamber, each internal pulse detonation chamber comprising a substantially closed proximal end portion, a distal end portion having an exhaust aperture, and a main body extending therebetween, the main body including an oxidizer inlet port and a fuel inlet port;

a plurality of fuel conduits, each extending between and connected to a separate one of the plurality of fuel inlet ports in the main body of the main pulse detonation chamber and the fuel inlet port of a separate one of the plurality of internal pulse detonation chambers; and a plurality of oxidizer conduits, each extending between and connected to a separate one of the plurality of oxidizer inlet ports in the main body of the main pulse detonation chamber and the oxidizer inlet port of a separate one of the plurality of internal pulse detonation chambers.

11. The pulse detonation apparatus as defined in claim 10, wherein the distal end portion of the main pulse detonation chamber is frusto-conically shaped to enhance exhaust velocity of an exhaust fluid exiting through the exhaust aperture in the distal end portion of the main pulse detonation chamber.

12. The pulse detonation apparatus as defined in claim 10, wherein the distal end portion of each of the plurality of internal pulse detonation chambers is frusto-conically shaped to enhance exhaust velocity of an exhaust fluid exiting through the exhaust aperture in the distal end portion of the respective separate internal pulse detonation chamber.

13. The pulse detonation apparatus as defined in claim 10, wherein the proximal end portion of a first one of the plurality of internal pulse detonation chambers defining a first internal pulse detonation chamber is conically shaped to enhance passage of exhaust gas from a second one of the plurality of internal pulse detonation chambers defining a second internal pulse detonation chamber positioned upstream of the first internal pulse detonation chamber, when encountering exhaust gas from the second internal pulse detonation chamber.

14. A pulse detonation apparatus, comprising:
- a main pulse detonation chamber comprising a proximal end portion, a distal end portion having and exhaust aperture, and a main body extending therebetween, the main body including a plurality of oxidizer inlet ports and a plurality of fuel inlet ports extending therethrough;
- a plurality of separate internal pulse detonation chambers positioned within the main body of the main pulse detonation chamber, each internal pulse detonation chamber comprising a substantially closed proximal end portion, a distal end portion having an exhaust aperture, and a main body extending therebetween, the main body including an oxidizer inlet port and a fuel inlet port, wherein each of the plurality of separate internal pulse detonation chambers are separately longitudinally positioned within the main body of the main pulse detonation chamber;
- a plurality of fuel conduits, each extending between a separate one of the plurality of fuel inlet ports in the main body of the main pulse detonation chamber and the fuel inlet port of a separate one of the plurality of internal pulse detonation chambers; and
- a plurality of oxidizer conduits, each extending between a separate one of the plurality of oxidizer inlet ports in the main body of the main pulse detonation chamber and the oxidizer inlet port of a separate one of the plurality of internal pulse detonation chambers.

15. The pulse detonation apparatus as defined in claim 14, wherein each of the plurality of separate internal pulse detonation chambers are positioned longitudinally along a common longitudinal axis so that deflagration to detonation waves generated by each separate one of the plurality of internal pulse detonation chambers travel in line with each other and exit out the aperture in the distal end portion of the main pulse detonation chamber.

16. The pulse detonation apparatus as defined in claim 10, wherein the pulse detonation apparatus is configured so that each of the plurality of internal pulse detonation chambers fire in a sequential order to thereby increase operating frequency.

17. The pulse detonation apparatus as defined in claim 10, wherein the pulse detonation apparatus is configured so that initial combustion takes place separately inside each of the plurality of internal pulse detonation chambers.

18. The pulse detonation apparatus as defined in claim 10, wherein each of the plurality of separate internal pulse detonation chambers are separately radially positioned within the main body of the main pulse detonation chamber so that deflagration to detonation waves exiting through the aperture in the distal end portion of the main pulse detonation are at a higher magnitude than individual deflagration to detonation waves generated by any separate one of the plurality of internal pulse detonation chambers.

19. The pulse detonation apparatus as defined in claim 10, wherein the pulse detonation apparatus is configured so that each of the plurality of internal pulse detonation chambers fire at a same time to thereby increase output magnitude.

20. A method of increasing a frequency or a magnitude of deflagration to detonation waves, the method comprising:
- supplying a fuel to each of a plurality of internal pulse detonation chambers, each internal pulse detonation chamber positioned within a main body of a common main pulse detonation chamber at a location substantially upstream of an exhaust aperture of a distal end portion of the main pulse detonation chamber;
- oxidizing the fuel within each of the plurality of internal pulse detonation chambers; and
- expelling exhaust gas from each of the plurality of internal pulse detonation chambers into the common main pulse detonation chamber at a location substantially upstream of the exhaust aperture of the distal end portion of the main pulse detonation chamber to thereby create a plurality of deflagration to detonation waves within the common main pulse detonation chamber, each of the plurality of deflagration to detonation waves exiting through a same one or more exhaust apertures in the common main pulse detonation chamber.

21. The method as defined in claim 20, further comprising the step of positioning each of the plurality of separate internal pulse detonation chambers longitudinally along a common longitudinal axis so that deflagration to detonation waves generated by each separate one of the plurality of internal pulse detonation chambers travel in line with each other and exit out the one or more exhaust apertures.

22. The method as defined in claim 21, wherein the step of oxidizing fuel within each of a plurality of internal pulse detonation chambers includes the step of firing each of the plurality of internal pulse detonation chambers in a sequential order to thereby increase operating frequency of the main pulse detonation chamber.

23. The method as defined in claim 20, wherein the step of oxidizing fuel within each of a plurality of internal pulse detonation chambers includes the step of firing each of the plurality of internal pulse detonation chambers at a same time to thereby increase output magnitude of the main pulse detonation chamber.

24. The method as defined in claim 20, further comprising the step of applying the deflagration to detonation waves to an undesired fluid flow area to provide directional control to the undesired flow area.

* * * * *